US012786069B2

(12) United States Patent
Wang et al.

(10) Patent No.: US 12,786,069 B2
(45) Date of Patent: Nov. 3, 2026

(54) GRAPH BASED ANOMALY DETECTION IN CELLULAR NETWORKS

(71) Applicant: Samsung Electronics Co., Ltd., Suwon-si (KR)

(72) Inventors: Han Wang, Allen, TX (US); Yan Xin, Princeton, NJ (US); Yong Ren, Somerset, NJ (US); Jianzhong Zhang, Dallas, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/544,201

(22) Filed: Dec. 18, 2023

(65) Prior Publication Data

US 2024/0348507 A1 Oct. 17, 2024

Related U.S. Application Data

(60) Provisional application No. 63/458,575, filed on Apr. 11, 2023.

(51) Int. Cl.
*H04L 41/142* (2022.01)

(52) U.S. Cl.
CPC .................................. *H04L 41/142* (2013.01)

(58) Field of Classification Search
CPC .... H04L 41/142; H04L 41/0631; H04L 41/16
See application file for complete search history.

(56) References Cited

U.S. PATENT DOCUMENTS 11,438,226 B2 9/2022 Engi et al.
11,636,090 B2 * 4/2023 Li ......................... G06F 16/168 707/690
11,711,391 B2 7/2023 Dong et al.
2018/0150547 A1 * 5/2018 Pallath ................... G06N 20/20
2022/0376970 A1 * 11/2022 Chawathe ........... H04L 41/0654
2023/0050889 A1 * 2/2023 Kumar Jaya Kumar .................... G06F 16/9027
2023/0052533 A1 2/2023 Furtak
2023/0085991 A1 * 3/2023 Liebman ............ G05B 23/0259 700/79
2023/0138371 A1 5/2023 Bandukwala et al.

OTHER PUBLICATIONS

Yen, C., et al., "Graph Neural Network based Root Cause Analysis Using Multivariate Time-series KPIs for Wireless Networks", NOMS 2022-2022 IEEE/IFIP Network Operations and Management Symposium, Apr. 25-29, 2022, 7 pages.

(Continued)

*Primary Examiner* — Philip C Lee

(57) ABSTRACT

A method includes generating multiple embedded features representing operational data of network elements in a wireless communication network. The method also includes generating a relationship graph based on the embedded features, the relationship graph representing behavior of the network elements in the wireless communication network. The method also includes detecting one or more anomalies in the wireless communication network using the relation-ship graph, the one or more anomalies identifying one or more deviations of one or more of the network elements from an expected behavior of the one or more network elements. The method also includes generating network analytics based on the one or more detected anomalies.

20 Claims, 13 Drawing Sheets

(56) References Cited

OTHER PUBLICATIONS

Deng, A., et al., "Graph Neural Network-Based Anomaly Detection in Multivariate Time Series", arXiv:2106.06947v1 [cs.LG] Jun. 13, 2021, 9 pages.
Wang, H., et al., "Groot: An Event-graph-based Approach for Root Cause Analysis in Industrial Settings", arXiv:2108.00344v2 [cs.SE] Sep. 22, 2021, 11 pages.

* cited by examiner

GRAPH BASED ANOMALY DETECTION IN CELLULAR NETWORKS

CROSS-REFERENCE TO RELATED APPLICATIONS AND CLAIM OF PRIORITY

The present application claims priority to U.S. Provisional Patent Application No. 63/458,575 filed on Apr. 11, 2023. The content of the above-identified patent document is incorporated herein by reference.

TECHNICAL FIELD

This disclosure relates generally to wireless communications systems. Embodiments of this disclosure relate to methods and apparatuses for graph based anomaly detection in cellular networks.

BACKGROUND

The fifth generation of cellular networks (5G) is significantly more complex than its predecessors due to several factors, such as increased cell density, differentiated service requirements, and coexistence with legacy networks. Traditional operation and management (O&M) solutions, which heavily rely on human intervention, become infeasible to support such complex networks at reasonable operating expense (OPEX). In recent years, the telecommunication industry has realized that leveraging artificial intelligence (AI) technology to enable a fully automated network O&M can be helpful in lowering OPEX and enhancing network key performance indicators (KPIs) for 5G, Beyond 5G (B5G), and the sixth generation of cellular networks (6G).

SUMMARY

Embodiments of the present disclosure provide methods and apparatuses for graph based anomaly detection in cellular networks.

In one embodiment, a method includes generating multiple embedded features representing operational data of network elements in a wireless communication network. The method also includes generating a relationship graph based on the embedded features, the relationship graph representing behavior of the network elements in the wireless communication network. The method also includes detecting one or more anomalies in the wireless communication network using the relationship graph, the one or more anomalies identifying one or more deviations of one or more of the network elements from an expected behavior of the one or more network elements. The method also includes generating network analytics based on the one or more detected anomalies.

In another embodiment, a device includes a transceiver and a processor operably connected to the transceiver. The processor is configured to: generate multiple embedded features representing operational data of network elements in a wireless communication network; generate a relationship graph based on the embedded features, the relationship graph representing behavior of the network elements in the wireless communication network; detect one or more anomalies in the wireless communication network using the relationship graph, the one or more anomalies identifying one or more deviations of one or more of the network elements from an expected behavior of the one or more network elements; and generate network analytics based on the one or more detected anomalies.

In another embodiment, a non-transitory computer readable medium includes program code that, when executed by a processor of a device, causes the device to: generate multiple embedded features representing operational data of network elements in a wireless communication network; generate a relationship graph based on the embedded features, the relationship graph representing behavior of the network elements in the wireless communication network; detect one or more anomalies in the wireless communication network using the relationship graph, the one or more anomalies identifying one or more deviations of one or more of the network elements from an expected behavior of the one or more network elements; and generate network analytics based on the one or more detected anomalies.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C. As used herein, such terms as "1st" and "2nd," or "first" and "second" may be used to simply distinguish a corresponding component from another and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
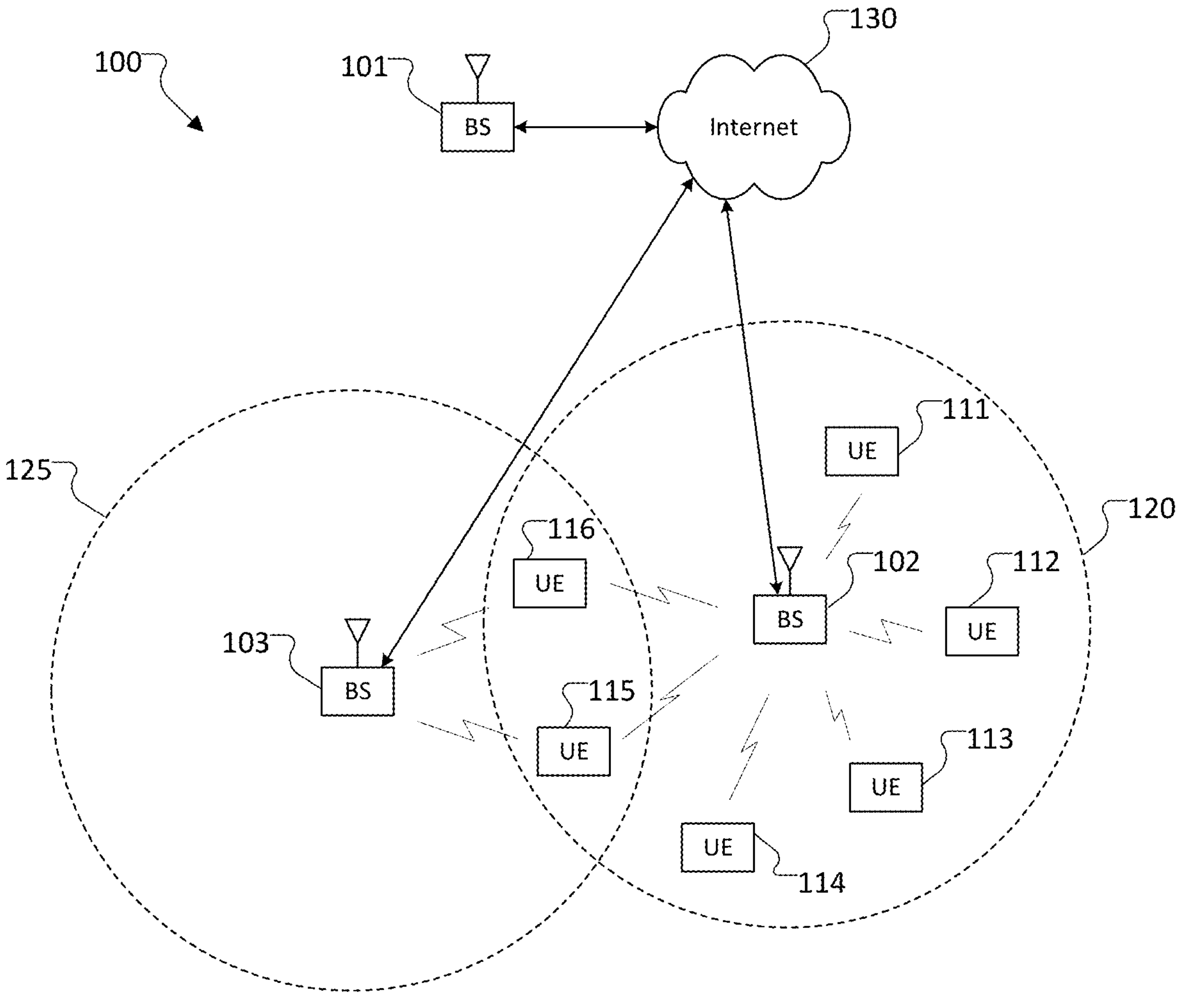
FIG. 1 illustrates an example wireless network according to various embodiments of the present disclosure.

FIGS. 1 through 13, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Aspects, features, and advantages of the disclosure are readily apparent from the following detailed description, simply by illustrating a number of particular embodiments and implementations, including the best mode contemplated for carrying out the disclosure. The disclosure is also capable of other and different embodiments, and its several details can be modified in various obvious respects, all without departing from the spirit and scope of the disclosure. Accordingly, the drawings and description are to be regarded as illustrative in nature, and not as restrictive. The disclosure is illustrated by way of example, and not by way of limitation, in the figures of the accompanying drawings.

The present disclosure covers several components which can be used in conjunction or in combination with one another or can operate as standalone schemes. Certain embodiments of the disclosure may be derived by utilizing a combination of several of the embodiments listed below. Also, it should be noted that further embodiments may be derived by utilizing a particular subset of operational steps as disclosed in each of these embodiments. This disclosure should be understood to cover all such embodiments.

To meet the demand for wireless data traffic having increased since deployment of 4G communication systems and to enable various vertical applications, 5G/NR communication systems have been developed and are currently being deployed. The 5G/NR communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancelation and the like.

The discussion of 5G systems and frequency bands associated therewith is for reference as certain embodiments of the present disclosure may be implemented in 5G systems. However, the present disclosure is not limited to 5G systems, or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

Figure 2:
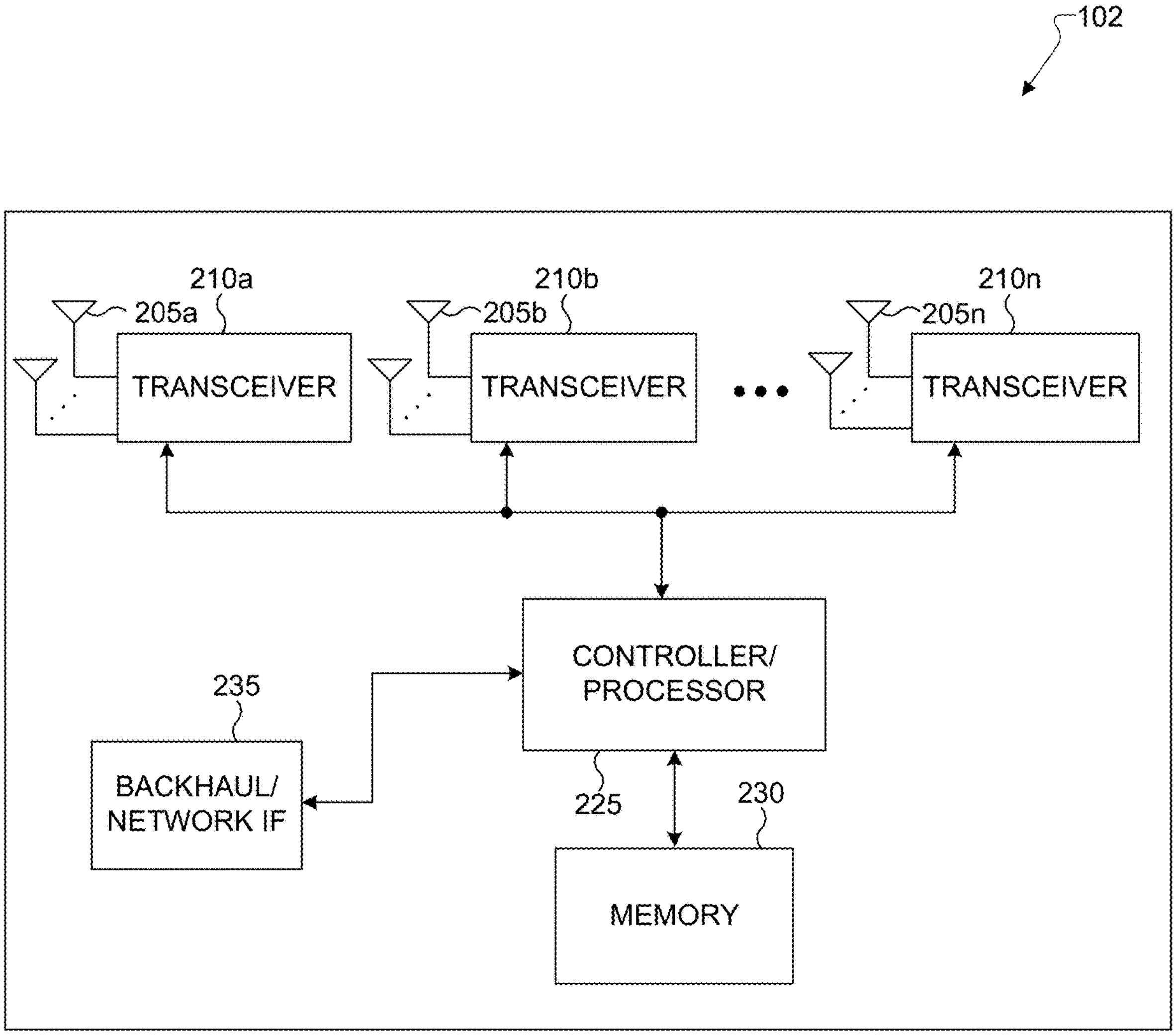
FIG. 2 illustrates an example gNB according to various embodiments of the present disclosure.
Figure 3:
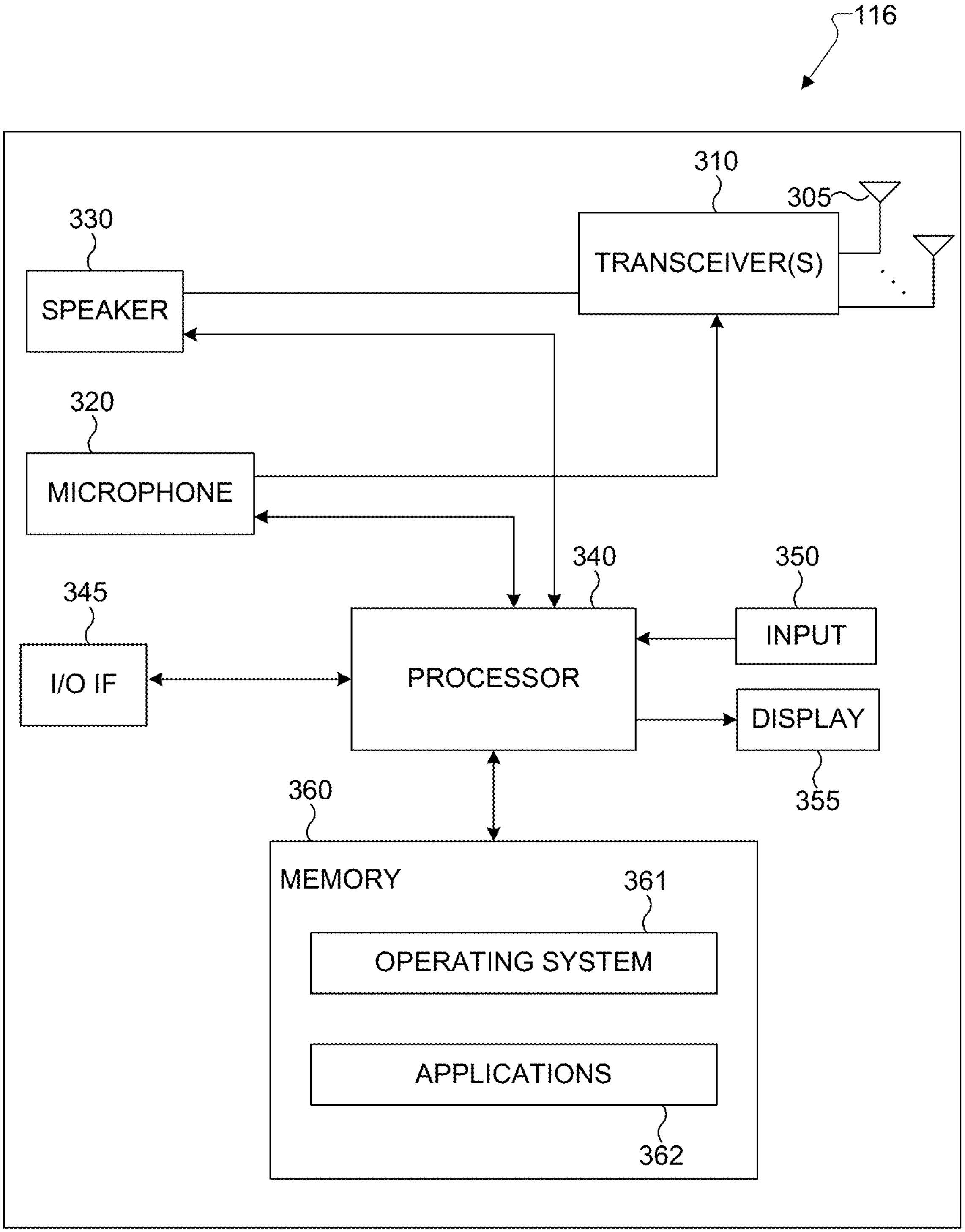
FIG. 3 illustrates an example UE according to various embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise; a UE 113, which may be a WiFi hotspot; a UE 114, which may be located in a first residence; a UE 115, which may be located in a second residence; and a UE 116, which may be a mobile device, such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, long term evolution (LTE), long term evolution-advanced (LTE-A), WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3rd generation partnership project (3GPP) NR, long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programming, or a combination thereof for performing graph based anomaly detection in cellular networks. In certain embodiments, one or more of the gNBs 101-103 includes circuitry, programming, or a combination thereof for performing graph based anomaly detection in cellular networks.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to various embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas **205*a*-205*n*, multiple transceivers 210*a*-210*n*, a controller/processor 225, a memory 230, and a backhaul or network interface 235**.

The transceivers **210*a*-210*n* receive, from the antennas 205*a*-205*n*, incoming RF signals, such as signals transmitted by UEs in the network 100. The transceivers 210*a*-210*n* down-convert the incoming RF signals to generate IF or baseband signals. The IF or baseband signals are processed by receive (RX) processing circuitry in the transceivers 210*a*-210*n* and/or controller/processor 225, which generates processed baseband signals by filtering, decoding, and/or digitizing the baseband or IF signals. The controller/processor 225** may further process the baseband signals.

Transmit (TX) processing circuitry in the transceivers **210*a*-210*n* and/or controller/processor 225 receives analog or digital data (such as voice data, web data, e-mail, or interactive video game data) from the controller/processor 225. The TX processing circuitry encodes, multiplexes, and/or digitizes the outgoing baseband data to generate processed baseband or IF signals. The transceivers 210*a*-210*n* up-converts the baseband or IF signals to RF signals that are transmitted via the antennas 205*a*-205*n***.

The controller/processor 225 can include one or more processors or other processing devices that control the overall operation of the gNB 102. For example, the controller/processor 225 could control the reception of UL channel signals and the transmission of DL channel signals by the transceivers **210*a*-210*n* in accordance with well-known principles. The controller/processor 225 could support additional functions as well, such as more advanced wireless communication functions. For instance, the controller/processor 225 could support graph based anomaly detection in cellular networks. Any of a wide variety of other functions could be supported in the gNB 102 by the controller/processor 225**.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. Also, various components in FIG. 2 could be combined, further subdivided, or omitted and additional components could be added according to particular needs.

FIG. 3 illustrates an example UE 116 according to various embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes antenna(s) 305, a transceiver(s) 310, and a microphone 320. The UE 116 also includes a speaker 330, a processor 340, an input/output (I/O) interface (IF) 345, an input 350, a display 355, and a memory 360. The memory 360 includes an operating system (OS) 361 and one or more applications 362.

The transceiver(s) 310 receives from the antenna 305, an incoming RF signal transmitted by a gNB of the network 100. The transceiver(s) 310 down-converts the incoming RF signal to generate an intermediate frequency (IF) or baseband signal. The IF or baseband signal is processed by RX processing circuitry in the transceiver(s) 310 and/or processor 340, which generates a processed baseband signal by filtering, decoding, and/or digitizing the baseband or IF signal. The RX processing circuitry sends the processed baseband signal to the speaker 330 (such as for voice data) or is processed by the processor 340 (such as for web browsing data).

TX processing circuitry in the transceiver(s) 310 and/or processor 340 receives analog or digital voice data from the microphone 320 or other outgoing baseband data (such as web data, e-mail, or interactive video game data) from the processor 340. The TX processing circuitry encodes, multiplexes, and/or digitizes the outgoing baseband data to generate a processed baseband or IF signal. The transceiver(s) 310 up-converts the baseband or IF signal to an RF signal that is transmitted via the antenna(s) 305.

The processor 340 can include one or more processors or other processing devices and execute the OS 361 stored in the memory 360 in order to control the overall operation of the UE 116. For example, the processor 340 could control the reception of DL channel signals and the transmission of UL channel signals by the transceiver(s) 310 in accordance with well-known principles. In some embodiments, the processor 340 includes at least one microprocessor or microcontroller.

The processor 340 is also capable of executing other processes and programs resident in the memory 360, such as processes for graph based anomaly detection in cellular networks. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input 350 (which includes for example, a touchscreen, keypad, etc.) and the display 355. The operator of the UE 116 can use the input 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random-access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). In another example, the transceiver(s) 310 may include any number of transceivers and signal processing chains and may be connected to any number of antennas. Also, while FIG. 3 illustrates the UE 116 configured as a mobile telephone or smartphone, UEs could be configured to operate as other types of mobile or stationary devices.

As discussed above, 5G networks are significantly more complex than their predecessors due to several factors, such as increased cell density, differentiated service requirements, and coexistence with legacy networks. Traditional O&M solutions, which heavily rely on human intervention, become infeasible to support such complex networks at reasonable OPEX. In recent years, the telecommunication industry has realized that leveraging AI technology to enable a fully automated network O&M can be helpful in lowering OPEX and enhancing network KPIs for 5G, B5G, and 6G cellular networks.

To this end, the 3rd Generation Partnership Project (3GPP) has developed standards for Self-Organizing Networks (SON) that aim to automate configuration, optimization, and healing processes for cellular networks. The automatic healing (also called self-healing) process starts with the detection of a network issue such as a degradation in a KPI. Accurate detection of KPI degradation is important for making follow-up decisions such as what to heal and how to heal the network. Conventional techniques are largely dependent on domain knowledge and statistical methods. Therefore, conventional detection procedures are very time-consuming and labor-intensive. With the emergence of 5G technology, cellular networks are becoming increasingly complex and generating vast amounts of data, making anomaly detection (AD) using conventional methods unfeasible. Therefore, an AI-based high-performance AD method is helpful to assist human experts and help automate the healing process as much as possible. The quality of service (QoS) benefits of such AI-based method are clear: higher detection accuracy, faster response time and less operational cost.

Many studies on AD overlook the interdependence of cells within cellular networks. However, in reality, cells in cellular networks can exhibit substantial interactions, especially in 5G networks where cells are densely distributed. Graph-like data models can effectively represent the interactions among cells, as a cellular network can be viewed as a graph that includes various nodes (i.e., cells) and edges (i.e., interactions between cells). By utilizing a graphical approach, one can gain insights into the complex relationships and dependencies among cells, which can aid in understanding the underlying mechanisms of cellular processes. Graph neural networks (GNNs) and graph attention networks have proved successful on recommender systems, social network analysis, traffic planning, and the like.

A cellular network can be formulated as a graph G=(V, E), where V is the set of vertices or nodes, and E is the set of edges or links. V can be defined upon all network elements (NEs) or a subset of NEs, with each node representing the entity of the NE or an aspect of the NE, such as a KPI or key quality indicator (KQI). E can be derived based on various factors, such as interactions, geographical information, artificial clusters, or algorithms.

As cellular networks continue to become more complex, the significantly increased data volume makes network operations more complicated. As a result, conventional approaches of AD and root cause analysis (RCA) are becoming more infeasible. This poses a number of challenges, including (1) how to apply causal analysis with huge volume of data, (2) how to include both local and global neighbors for analysis, and (3) how to provide faster responses to incidents while reducing operational costs.

To address these and other issues, this disclosure provides systems and methods for graph based anomaly detection in cellular networks. The disclosed embodiments are suitable for different levels of network elements, such as cell level, eNodeB level, and the like. The disclosed embodiments include an AD/RCA system at the network element level that includes a relationship graph. The relationship graph is a logical relationship graph for network elements in a network, which describes the spatial dependency between network elements. The disclosed embodiments also include one or more AI modules capable of executing graph-based machine learning algorithms to generate various network analytics, which can include a causal graph of anomalies and an anomaly report with deviation-based anomaly scoring and ranking.

Note that while some of the embodiments discussed below are described in the context of 5G systems, these are merely examples. It will be understood that the principles of this disclosure may be implemented in any number of other suitable contexts or systems, including 6G and other systems.

Figure 4:
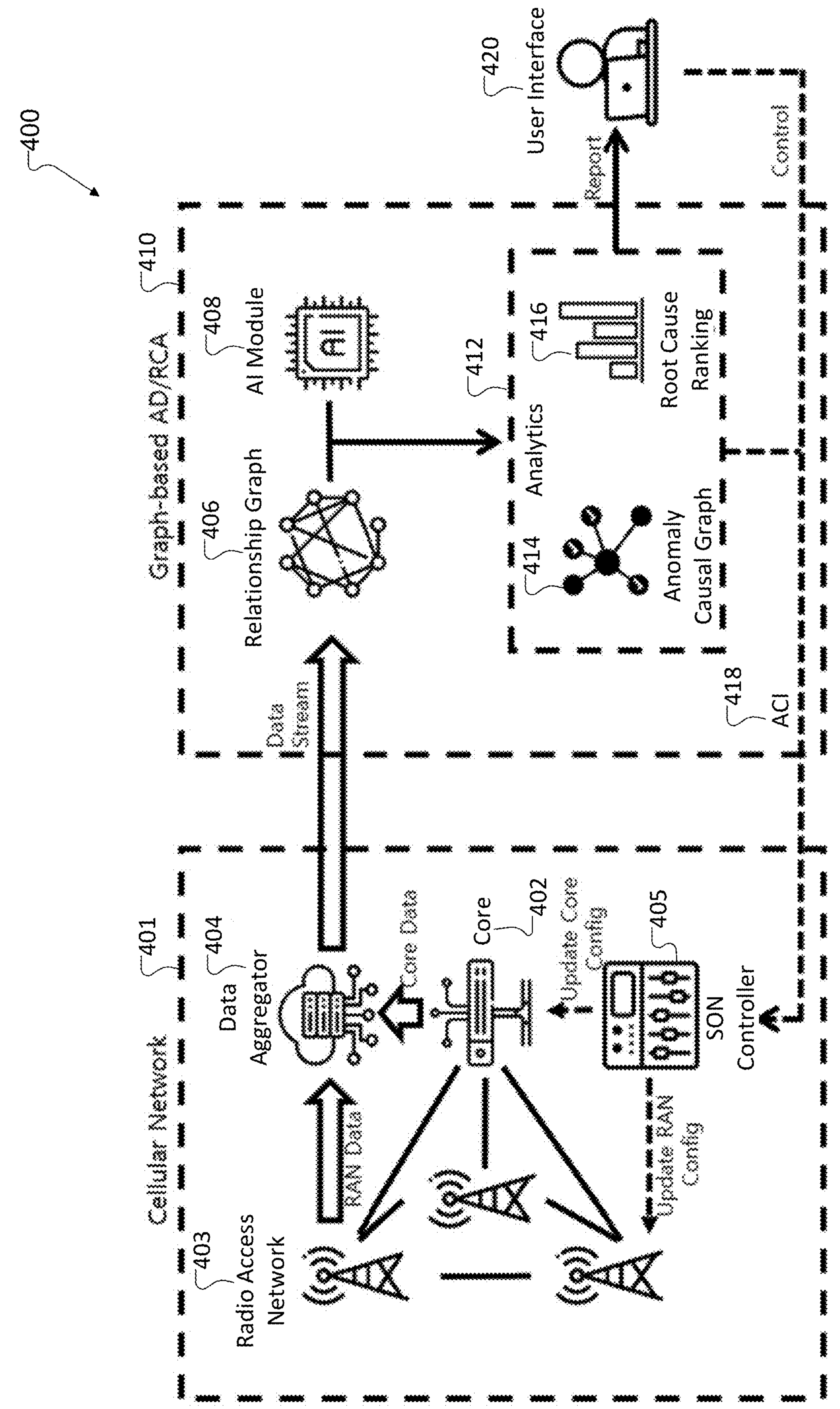
FIG. 4 illustrates an example system for graph based anomaly detection and root cause analysis in cellular networks according to various embodiments of the present disclosure.

FIG. 4 illustrates an example system 400 for graph based anomaly detection and root cause analysis in cellular networks according to various embodiments of the present disclosure. The embodiment of the system 400 shown in FIG. 4 is for illustration only. Other embodiments of the system 400 could be used without departing from the scope of this disclosure. For ease of explanation, the system 400 will be described as being implemented in a network element, such as the gNB 102 of FIG. 1. However, the system 400 could be implemented in any other suitable device.

As shown in FIG. 4, the system 400 includes the cellular network infrastructure 401 and a graph-based AD/RCA module 410. The cellular network infrastructure 401 acts as a data source for the AD/RCA module 410 and includes the core 402 (such as an Evolved Packet Core (EPC) or a 5G Core (5GC)) and the Radio Access Network (RAN) 403. The data from the RAN 403 can include measurements, metrics, and other operational data collected from base stations and UE devices. Data from the core 402 and the RAN 403 may be collected and aggregated at intermediate nodes 404, also known as data aggregators, Element Management Systems (EMS), or LTE Management Systems (LMS). The operational data may include Performance Management (PM) data (such as KQIs/KPIs, counters, and metrics), which may be in the form of structured time series data or as unstructured data, such as log files. Fault Management (FM) data (such as alarm events indicating a device failure or error state has occurred in the network) may also be included. Moreover, Configuration Management (CM) data (such as a log of configuration changes including timestamps and IDs of the network devices with before and after parameter values) may be included. The data aggregator 404 may perform data aggregation in various ways, such as temporal aggregation based on time granularities, spatial aggregation from cells to base stations, band aggregation, and QoS Class Identifier (QCI) aggregation.

Network data from the data aggregator 404 may be transferred to the AD/RCA module 410, which uses the network data to generate a relationship graph 406. The relationship graph 406 can evolve periodically with the stream of data to reflect the real-time changes in cellular networks. The AD/RCA module 410 also includes an AI module 408 that integrates with the graph data structure and uses the relationship graph 406 as input to generate network analytics 412. The network analytics 412 can include an anomaly causal graph 414 and a root cause ranking 416 that are easy to understand by a network operation engineer. Further details on the functions of the AI module 408 and the network analytics 412 are provided below. Because of modularization, machine learning engineers can work with the AI module 408 to utilize pre-trained models with fine-tuning or allow online training to generate self-adaptive models.

The network analytics 412 generated by the AI module 408 can include Analytics and Control Information (ACI) messages 418, which may then be sent to one or more SON controllers 405 in order to automate low-risk operations. However, these operations are open to human intervention via a user interface 420. It is noted that the AI module 408 and the SON controller 405 can exist in either a centralized or distributed manner. In other words, the AI module 408 and the SON controller 405 can be hosted at a data center, a local central office near the RAN 403, or co-located with a BS itself. The AI module 408 also identifies which devices or variables the SON controller 405 should monitor in the ACI messages 418, allowing the SON controller 405 to monitor a subset of network devices and data variables for more efficient operations.

In some embodiments, the network analytics 412 can include one or more AD/RCA reports that can be provided to a network operation engineer for analysis via the user interface 420. The user interface 420 can be either graphical-based (GUI) or command-line-based (CLI) to display the analytics results. Additionally, the user interface 420 may accept commands from the user, which may be sent to the SON controller 405 or directly to the network elements to perform an action, such as a configuration update. As self-healing becoming a key component of SON, such intelligent AD/RCA aims to automate troubleshooting and repairing as much as possible, increasing the cellular network's resilience to unexpected incidents and changes.

Figure 5:
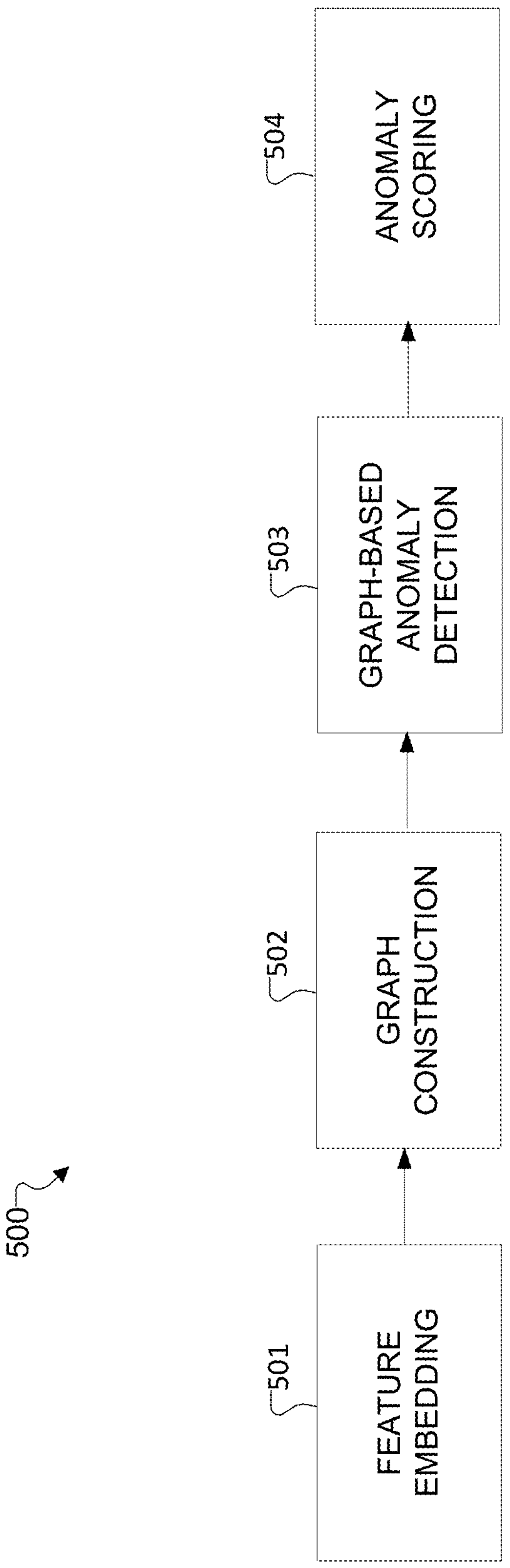
FIG. 5 illustrates an example process for graph based anomaly detection and root cause analysis in cellular networks according to various embodiments of the present disclosure.

FIG. 5 illustrates an example process 500 for graph based anomaly detection and root cause analysis in cellular networks according to various embodiments of the present disclosure. The embodiment of the process 500 shown in FIG. 5 is for illustration only. Other embodiments of the process 500 could be used without departing from the scope of this disclosure. For ease of explanation, the process 500 will be described as being implemented using the AD/RCA module 410 of FIG. 4. However, the process 500 could be implemented in any other suitable device.

As shown in FIG. 5, the process 500 includes a feature embedding operation 501, a graph construction operation 502, a graph-based anomaly detection operation 503, and an anomaly scoring operation 504, each of which is explained in greater detail below.

Feature Embedding Operation 501.

The purpose of the feature embedding operation 501 is to project the preprocessed operational data of NEs (such as PM KPIs and CM parameters) to embedded features in a multi-dimensional vector space, where the embedded features can be used by one or more machine learning algorithms (e.g., neural networks) that comprise the AI module 408. The original values of the preprocessed operational data can be either categorical or numeric, and can be either time-sensitive or time-insensitive. Therefore, the batches of data that the AD/RCA module 410 receives from the data aggregator 404 should first be preprocessed to have the same format and then an embedding algorithm is applied to the preprocessed feature data. The cellular network embedded features can be formulated as:

$$\vec{x_i} = f_i(K_i),\ i = 1 \ldots N,$$

where $K_i=\{k_{i,t}|0\leq t<T\}$ represents the set of ith input features at time t over time interval T, and $f_i$ represents the transform function that converts time series $K_i$ to an embedded vector $\vec{x}_i$. Note that the time interval length T depends on the time granularity of the collected operational data, and a longer T may give more reliable statistics of the cellular network operations.

Figure 6:
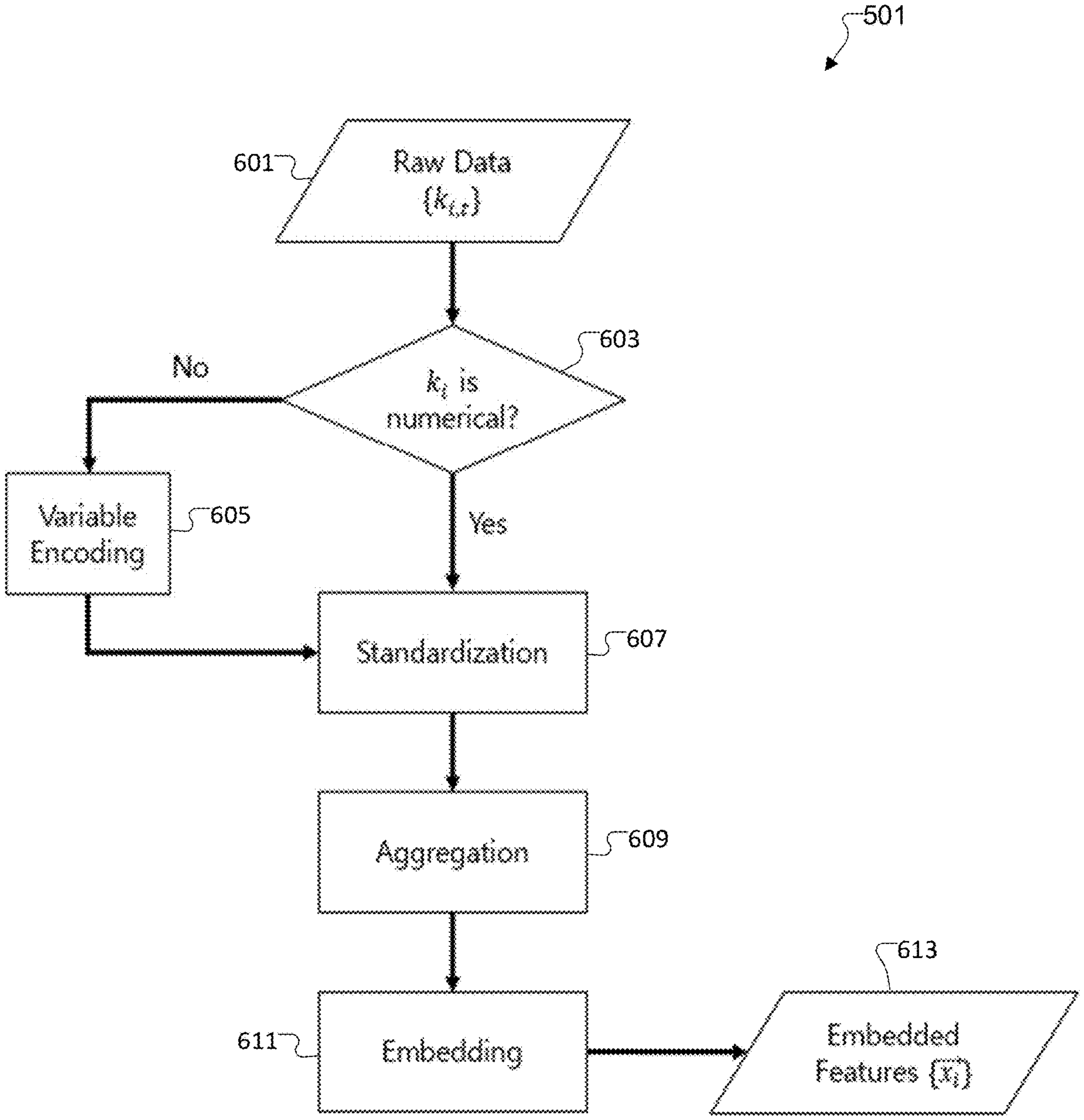
FIG. 6 illustrates further details of a feature embedding operation in the process of FIG. 5 according to various embodiments of the present disclosure.

FIG. 6 illustrates further details of the feature embedding operation 501 according to various embodiments of the present disclosure. As shown in FIG. 6, the feature embedding operation 501 includes step 601, at which the AD/RCA module 410 receives raw operational data $\{k_{i,t}\}$ from the data aggregator 404. At step 603, the AD/RCA module 410 determines whether the input $k_{i,t}$ is numerical or non-numerical. If the input $k_{i,t}$ is non-numerical, then at step 605, the AD/RCA module 410 executes an additional "variable encoding" step to categorize or quantify the feature with numerical values. Example variable encoding methods can include (but are not limited to) label encoding, one-hot encoding, and cardinal encoding. For example: Band=0 if n∈{US 700 Upper C, 850} else 1, where Band indicates the high (1) or low (0) band of a cell in a base station and n is the band name of the cell.

At step 607, the AD/RCA module 410 applies data standardization on the numerical features. Data standardization is a requirement for many machine learning algorithms, which can effectively improve the data quality. One representative technique of data standardization can be formulated as the following:

$$\widehat{k_{i,t}} = \frac{k_{i,t} - \overline{k_{i,t}}}{\sigma(k_{i,t})}.$$

The operational data of a cellular network may be dependent on many different levels of identifiers, such as cell, QCI (QoS Class Identifier), link (serving cell to target cell), etc. The standardized features $\widehat{k_{i,t}}$ with different identifiers are then aggregated by the AD/RCA module 410 at step 609 according to the nodes of the graph. The purpose of aggregation is to align the features to the same level, so that a graph model that contains nodes and edges can be constructed.

After feature aggregation, the AD/RCA module 410 implements an embedding layer 611, which projects the aggregated features in time series to embedded features 613 in multidimensional vector space $\vec{x}_i \in \mathbb{R}^d$, i=1 . . . N. In some embodiments, the embedding layer 611 works as a look up table for each of the time series features. Similar to the technique of word embedding in natural language processing (NLP), the embedded vector representation aims to capture the underlying factors and behaviors of features. The similarity between features can be measured by the distance of the vectors.

Graph Construction Operation 502.

The AD/RCA module 410 performs the graph construction operation 502 to generate the relationship graph 406, which is a data-driven graph model that partially or fully represents the complicated behavior of the cellular network 401. In the relationship graph G=(V, E), V is the set of vertices or nodes, and E is the set of edges or links. V can be defined upon all network elements (NEs) or a subset of NEs, with each node representing the entity of the NE or an aspect of the NE, such as a KPI or KQI. Based on the identifiers of the embedded features 613, the AD/RCA module 410 categorizes each of the embedded features 613 as either an interactive feature or a non-interactive feature. Here, interactive features require at least two nodes to identify, such as a handover event from a serving cell to a target cell in a cell-level graph. In contrast, non-interactive features require only one node to identify, such as the band and location of a cell in a cell-level graph.

Figure 7:
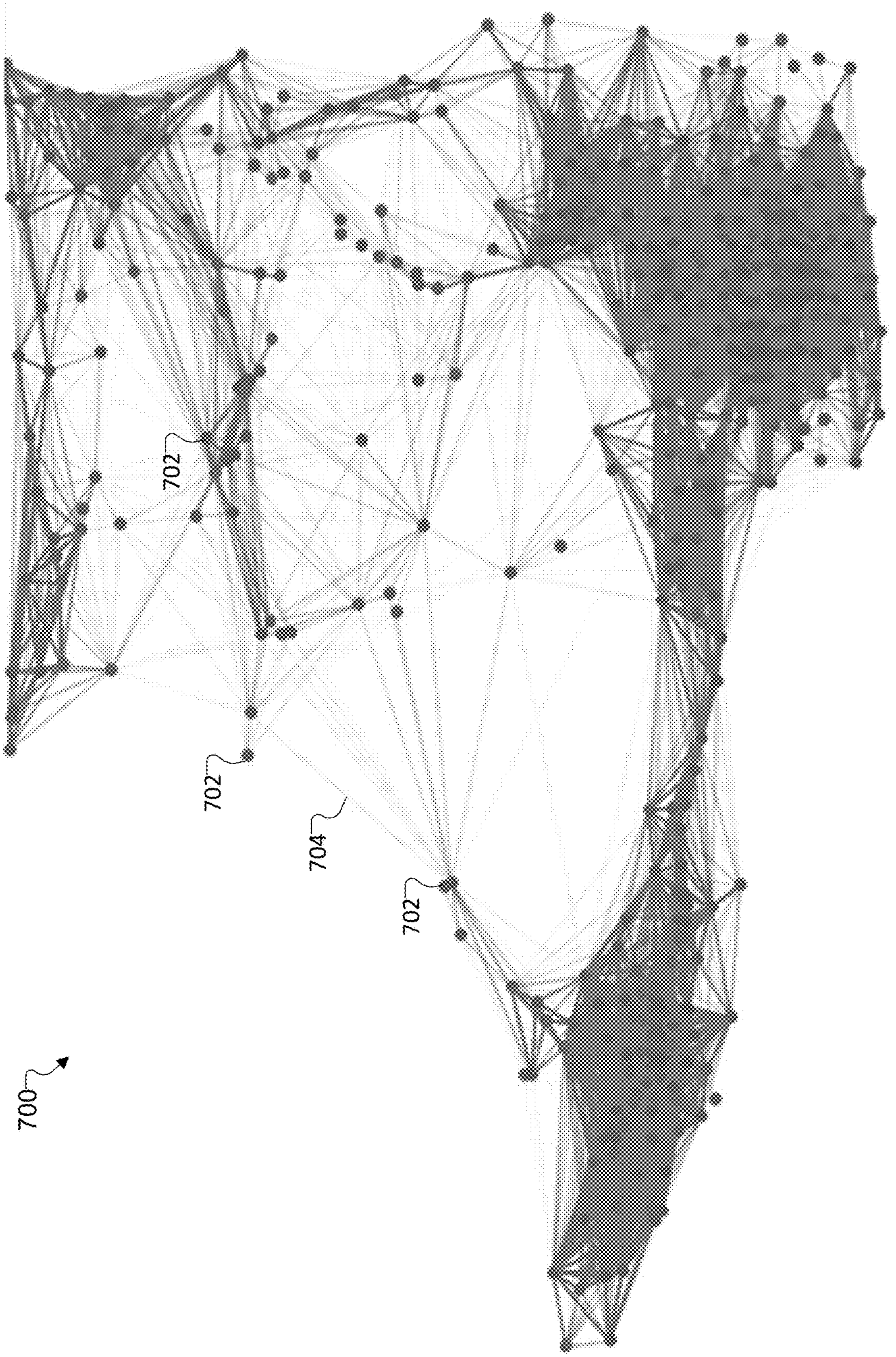
FIG. 7 illustrates an example NE relationship graph according to various embodiments of the present disclosure.

Interactive features can be used as the property of edges E, and non-interactive features can become the property of nodes N. It is noted that the interactions in a graph can be very dynamic and complicated. For this reason, it can be helpful to use historical data with a long time interval. FIG. 7 illustrates an example NE relationship graph 700 according to various embodiments of the present disclosure. As shown in FIG. 7, the relationship graph 700 is an adjacency relationship graph that includes multiple (e.g., dozens, hundreds, thousands, or more) nodes 702, each representing a NE of the network. In some embodiments, the nodes 702 in the relationship graph 700 can represent all NEs in a whole market. The nodes 702 are connected by edges 704, which represent relationships between connected NEs. In some networks, a graph with around 2000 nodes may have as many as 500,000 edges by interaction. Such a dense graph may not be feasible for node dependency analysis. In most cases, the sparseness of the graph should be controlled to avoid unnecessary computational complexity. Accordingly, the graph construction operation 502 is designed to reduce complexity, as described below.

Mathematically, edges E in a directed and weighted graph G=(V, E) can be represented with an adjacency matrix $A_{N \times N}$, in which an element $\alpha_{i,j}$ denotes the direction and weights of an edge from node i to node j. The adjacency matrix $A_{N \times N}$ can be generated from interactive features $\{\alpha_{i,j}\}$. However, in a real cellular network, a node may only interact with a limited number of nodes. Thus, the graph construction operation 502 exploits this fact in order to effectively model the interactive behaviors among the neighbors in the cellular network 401.

Figure 8:
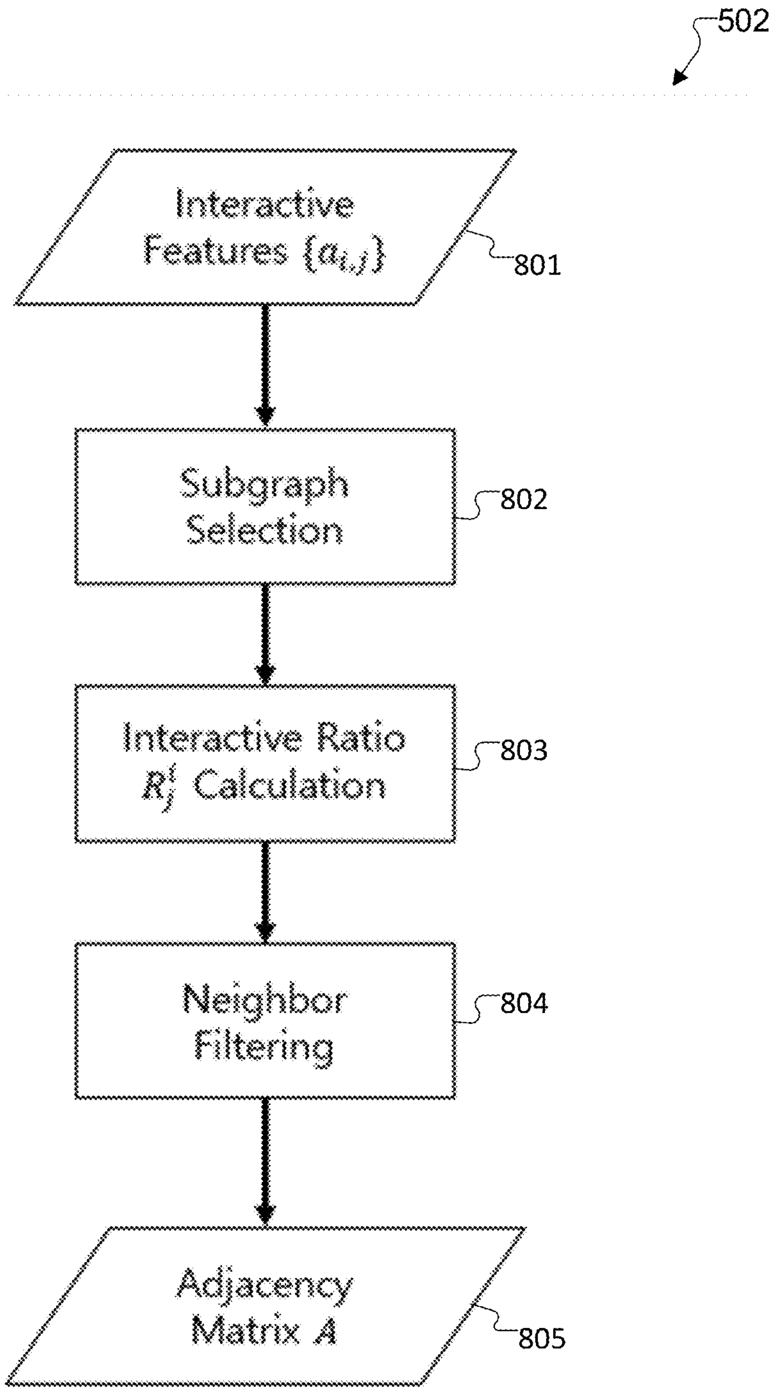
FIG. 8 illustrates further details of a graph construction operation in the process of FIG. 5 according to various embodiments of the present disclosure.

FIG. 8 illustrates further details of the graph construction operation 502 according to various embodiments of the present disclosure. As shown in FIG. 8, the graph construction operation 502 includes step 802, which is a subgraph selection step. At step 802, the AD/RCA module 410 applies a community detection algorithm to an original set 801 of interactive features $\{\alpha_{i,j}\}$ among the embedded features 613 to find subgraphs. The community detection algorithm can be any suitable detection algorithm, including (but not limited to) Louvain method, Leiden method, Walktrap method, and the like. The goal is to find all subgraphs representing communities of network elements with dense intra-connections but sparse inter-connections. It is noted that many suitable community detection algorithms are unsupervised and require no prior knowledge of the features.

Step 803 is an interactive ratio calculation. In step 803, the AD/RCA module 410 calculates, in each subgraph, an interactive ratio that quantifies the strength of interaction for each pair of nodes in the subgraph. The interactive ratio r can be defined as:

$$r_j^i = \frac{A_j^i}{\sum_k A_k^i}$$

where $$A_j^i$$

denotes the interactive feature between node i and j with $$A_j^i = a_{i,j} + a_{j,i}, \sum_k A_k^i$$

denotes the sum of all interactions that involve node i, and $$r_j^i$$

denotes the interactive ratio of node j with respect to node i.

The AD/RCA module 410 calculates the interactive ratio in each subgraph, and the interactive ratio quantifies the relative interaction strength between a node and all its neighbor nodes. Since the workload and interactions of nodes in a cellular network empirically obey power law, the absolute strength of interactions may not be a good indicator of the dependency within nodes.

Figure 9A:
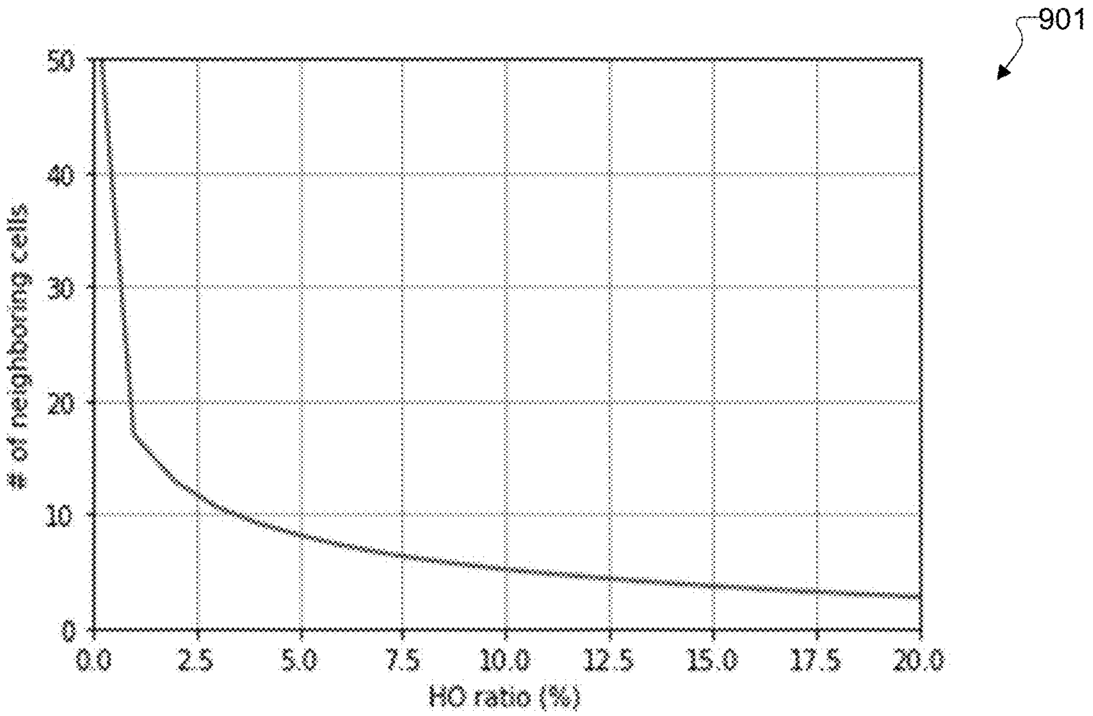
FIGS. 9A and 9B show examples of neighbor filtering according to various embodiments of the present disclosure.
Figure 9B:
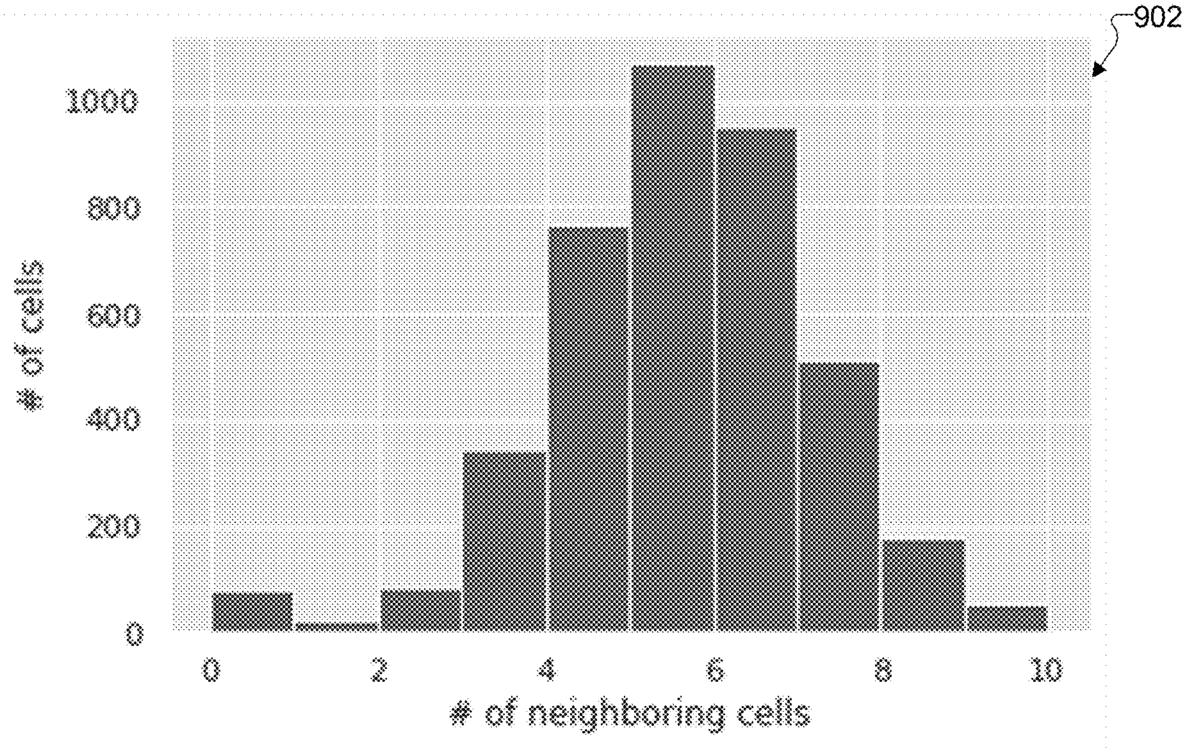

Step 804 is a neighbor filtering step. In step 804, the AD/RCA module 410 filters out some of the network elements based on the calculated interactive ratios. In particular, the AD/RCA module 410 keeps neighboring network elements with higher interactive ratio values, and removes neighboring network elements with lower interactive ratio values. In step 804, the overall distribution of the interactive features is analyzed, and empirically an elbow method can be used to determine the proper threshold $r_t$ of the interactive ratio of major neighbor nodes. FIGS. 9A and 9B show examples of neighbor filtering according to various embodiments of the present disclosure. In particular, FIG. 9A shows a chart 901 of the average number of major neighbors versus the interactive ratio, and FIG. 9B shows a chart 902 of the distribution of neighbor cell numbers per cell. The examples shown in FIGS. 9A and 9B use A3 Event and A5 Event counts as interactive features of a cell-level graph. The sparseness of the graph can therefore be controlled with a single parameter $r_t$ and can be tuned to a desired level. A new adjacency matrix $A_{N \times N}$ 805 is built based on the filtered lists of neighbor nodes.

Note that the graph construction operation 502 as described above is task-driven and may require domain knowledge. If no prior information about the interaction is known, the graph can be initialized with a fully connected adjacency matrix, and the interaction ratio then become the similarity between the node's embedding vectors $$e_j^i$$

divided by the sum of similarity $$\sum_j e_j^i,$$

such as by the following:

$$e_j^i = \frac{x_i \cdot x_j}{\|x_i\| \|x_j\|}$$

$$r_j^i = \frac{e_j^i}{\sum_j e_j^i}$$

Graph-Based Anomaly Detection Operation 503.

Similar to many conventional anomaly detection techniques, the graph-based anomaly detection operation 503 uses a forecast-based approach that identifies how much each node deviates from its expected behavior on each time step. However, unlike conventional techniques, the graph-based anomaly detection operation 503 is able to handle high-dimensional input data with graph representation. Together with the graph construction operation 502, the graph-based anomaly detection operation 503 is capable of providing multimodal solutions on cellular network trouble-shooting.

Figure 10:
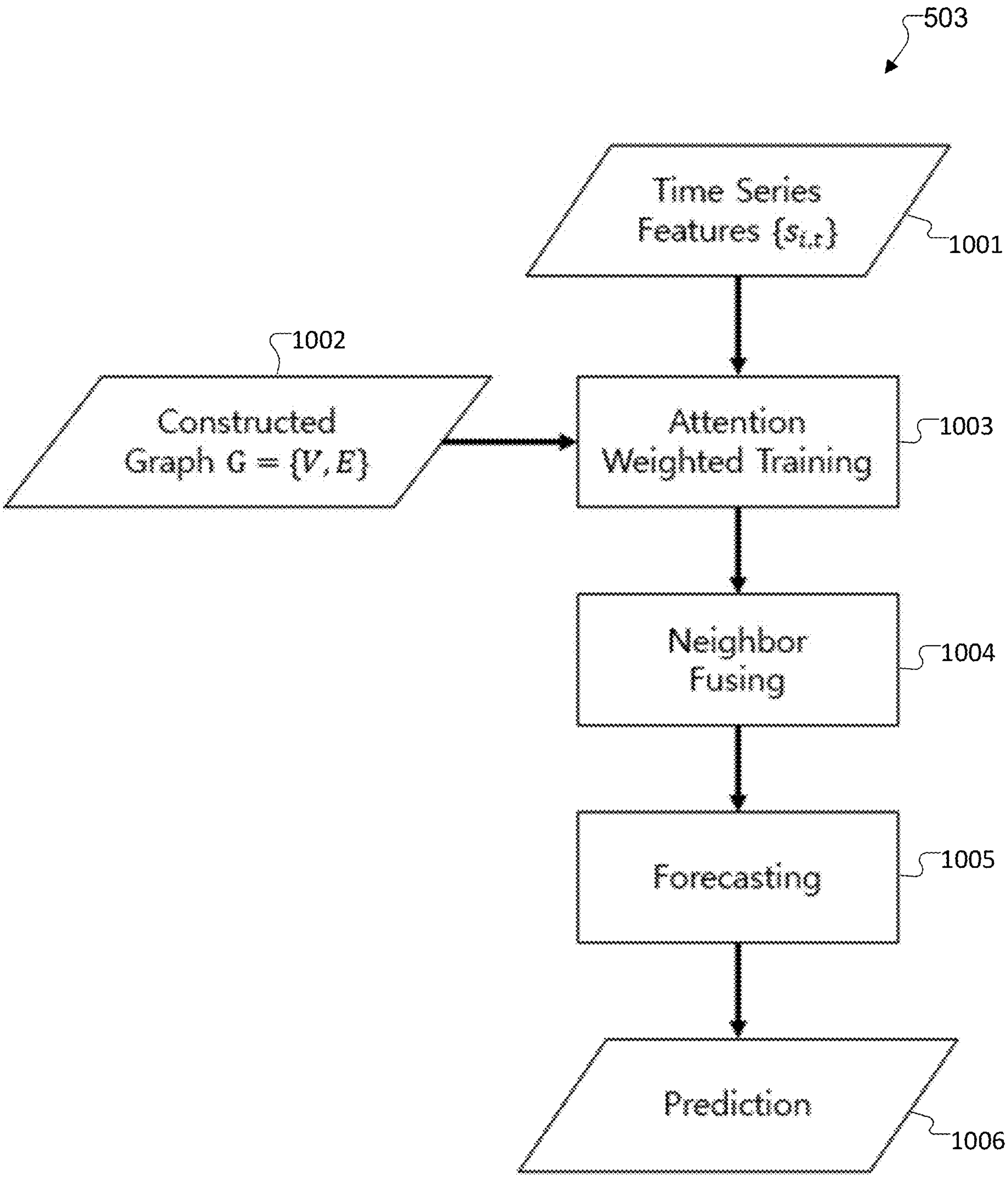
FIG. 10 illustrates further details of a graph-based anomaly detection operation in the process of FIG. 5 according to various embodiments of the present disclosure.

FIG. 10 illustrates further details of the graph-based anomaly detection operation 503 according to various embodiments of the present disclosure. As shown in FIG. 10, the graph-based anomaly detection operation 503 includes step 1003, which is an attention weighted training operation. In step 1003, the AD/RCA module 410 takes time series features $\{s_{i,t}\}$ 1001 and a constructed graph G 1002 as input. As mentioned above, the graph G 1002 is usually constructed with historical data (e.g., operational data from a few months), which gives stable statistics about the node behavior and interactions. However, for the purpose of real-time anomaly detection, a short time interval (e.g., hours or days for hourly data) is sufficient, and it can avoid data redundancy and reduce the computational cost. Typically, the attention mechanism can be modelled with a trainable attention matrix W. Let $x^{(t)}:=[s^{t-w}, s^{t-w-1}, \ldots, s^{t-1}]$ denote the input time series, N(i) denote the neighbor set of node i, the node embedding vector $v_i$ and the transformed feature can be concatenates as:

$$g_i^{(t)} = v_i \,\|\, Wx_i^{(t)}$$

Then the attention coefficients can be represented as:

$$e_{i,j} = LeakyReLU\left(a\left(g_i^{(t)} \,\|\, g_j^{(t)}\right)\right)$$

where $\alpha$ is a trainable linear or non-linear transformation. With a softmax normalization:

$$\alpha_{ij} = \frac{\exp(e_{ij})}{\sum_{k\in N(i)} \exp(e_{ik})}$$

Alternatively, a multi-head self-attention mechanism can be applied to stabilize the training procedure so that multiple attention mechanisms $$\alpha_{ij}^{l}$$

can be trained simultaneously and concatenated afterwards.

The graph-based anomaly detection operation 503 also includes step 1004, which is a neighbor fusing operation. With the attention mechanism, the node's information can therefore be fused with the neighbor nodes' information by an aggregation algorithm, such as the following:

$$z_i^{(t)} = ReLU\left(\alpha_{ii} Wx_i^{(t)} + \sum_{k\in N(i)} \alpha_{ij} Wx_j^{(t)}\right)$$

where $$z_i^{(t)}$$

is a neighbor fusing vector that is the result of neighbor fusing and the output of the attention layer. Here, this comprises a weighted matrix W, a transformation function $\alpha$, and non-linear functions LeakyReLU and ReLU. With multi-head self-attention mechanism, the above function becomes:

$$z_i^{(t)} = \|^{l}\, ReLU\left(\alpha_{ii}^{l} W^{l} x_i^{(t)} + \sum_{k\in N(i)} \alpha_{ij}^{l} W^{l} x_j^{(t)}\right)$$

The graph-based anomaly detection operation 503 also includes step 1005, which is a forecasting operation. A key step of anomaly detection is the quantification of how different a node's actual behavior is compared to its expected behavior. Therefore, step 1005 uses a forecast approach to determine the expected behavior of nodes. Given $x^{(t)}$ above, $z^{(t)}$ can be derived as an aggregated representation of nodes. Formally, the target of the forecasting is given as:

$$\hat{s}^{(t)} = f_\theta\left(\left[v_1 \circ z_1^{(t)}, \ldots, v_N \circ z_N^{(t)}\right]\right)$$

where $f_\theta$ is typically a multi-layer neural network, $\circ$ denotes elemental-wise multiplication, and $\hat{s}^{(t)}$ is the N-dimentional prediction 1006 of the graph state at time t. Here, the objective is to minimize an error function such as the minimum squared error (MSE) between the predictions and the observations:

$$L = \frac{\sum_{t=w+1}^{T} \left\|\hat{s}^{(t)} - s^{(t)}\right\|^2}{T - w}$$

where w denotes the size of sliding time window, and T denotes the total time length of training data.

Anomaly Scoring Operation 504.

The predictions $\hat{s}^{(t)}$ from the graph-based machine learning model can therefore be compared with the observation $s^{(t)}$. For each node, the difference can be quantified with metrics such as mean absolute error (MAE):

$$e_i = \left|\hat{s}_i^{(t)} - s_i^{(t)}\right|.$$

Practically, the deviation can be quantified with a modified z-score:

$$z_i^t = \frac{e_i^t - \mu_i}{\sigma_i}$$

where $\mu_i$ denotes the median of $$e_i^t$$

over time window w, and $\sigma_i$ denotes the median of $$|e_i^t - \mu_i|.$$

$$\max_i z_i^t$$

is therefore an alarm of anomaly at time t. By setting an adequate threshold, the AD/RCA module 410 is able to automatically detect and report anomalies. The threshold can be set with an unsupervised technique (because the score itself will tell if the error is large enough to reveal an anomaly), or with a supervised technique that is tuned by human experts. Additionally, anomalous nodes can be sorted by their anomaly scores to prioritize troubleshooting schedules.

Figure 11:
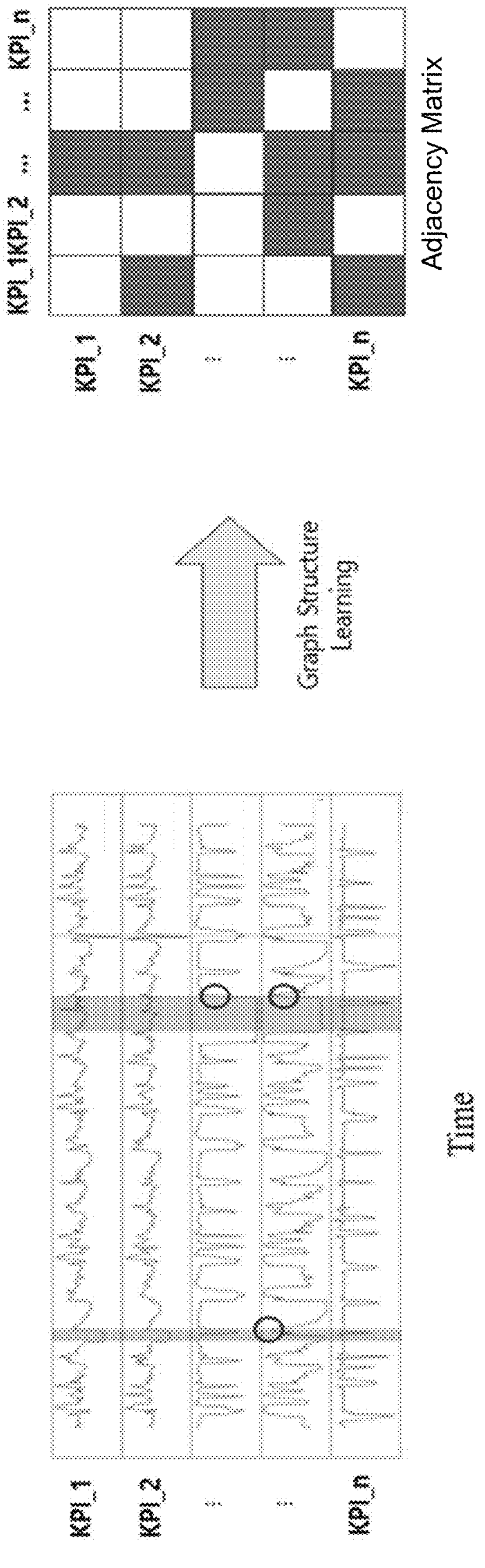
FIG. 11 illustrates an example of KPI graph structure learning according to various embodiments of the present disclosure.

FIG. 11 illustrates an example of KPI graph structure learning according to various embodiments of the present disclosure. As shown in FIG. 11, instead of using network elements (e.g., cells) as nodes of the graph, the properties of a network element, such as KPIs, can each be represented with a node in a graph. Graph structure learning can generate a dependency graph across the KPIs for causality analysis purposes.

Figure 12:
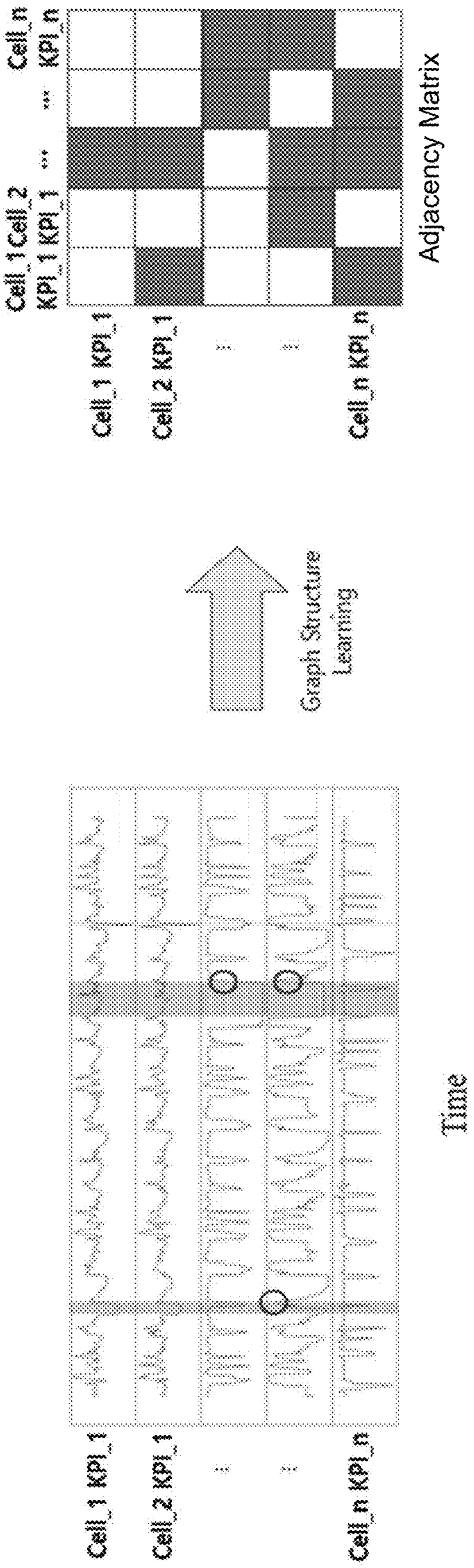
FIG. 12 illustrates an example of named entity-KPI graph structure learning according to various embodiments of the present disclosure.

FIG. 12 illustrates an example of named entity-KPI graph structure learning according to various embodiments of the present disclosure. As shown in FIG. 12, instead of representing named entities as nodes, individual properties of named entities, such as key performance indicators (KPIs), can be represented as nodes in the graph. Graph structure learning techniques can generate a comprehensive dependency graph across KPIs from different named entities.

Note that the differences between FIG. 11 and FIG. 12 include the following:

In FIG. 12, the properties of multiple named entities are modeled in the network, and properties with the same name but from different named entities as different kinds of properties are considered. FIG. 11 only utilizes the properties within one network element.

The technique of FIG. 12 intends to learn the cross-named entity property dependency, while the technique of FIG. 11 intends to learn the internal property dependency within one network element.

The technique of FIG. 12 is useful when there is need to investigate the root cause of anomalies from a cluster of named entities, or from a market that contains multiple clusters of named entities. The technique of FIG. 11 is useful when there is a need to investigate the root cause of an anomaly within a network element, when the neighboring network elements operate normally, without signs associated with the anomaly.

Although FIGS. 5 through 12 illustrate examples of a process 500 for graph-based anomaly detection and related details, various changes may be made to FIGS. 5 through 12. For example, various components in FIGS. 5 through 12 could be combined, further subdivided, or omitted and additional components could be added according to particular needs. In addition, while shown as a series of steps, various operations in FIGS. 5 through 12 could overlap, occur in parallel, occur in a different order, or occur any number of times. In another example, steps may be omitted or replaced by other steps.

Figure 13:
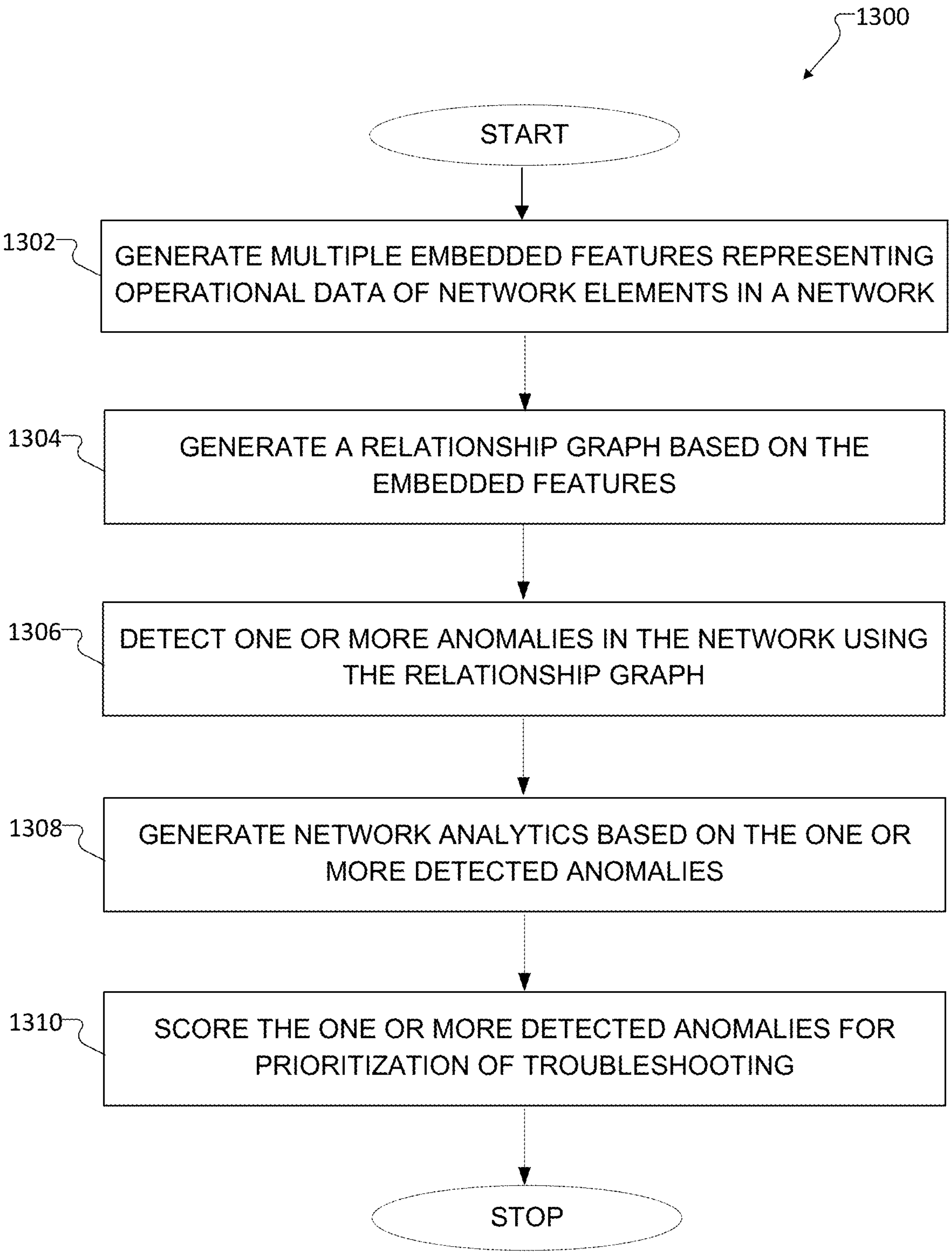
FIG. 13 illustrates a flow chart of a method for graph-based anomaly detection according to various embodiments of the present disclosure.

FIG. 13 illustrates a flow chart of a method 1300 for graph-based anomaly detection according to various embodiments of the present disclosure, as may be performed by one or more components of the wireless network 100 (e.g., the gNB 102). The embodiment of the method 1300 shown in FIG. 13 is for illustration only. One or more of the components illustrated in FIG. 13 can be implemented in specialized circuitry configured to perform the noted functions or one or more of the components can be implemented by one or more processors executing instructions to perform the noted functions.

As illustrated in FIG. 13, the method 1300 begins at step 1302. At step 1302, multiple embedded features are generated that represent operational data of network elements in a wireless communication network. This could include, for example, the gNB 102 performing the feature embedding operation 501 to generate embedded features, such as the embedded features 613.

At step 1304, a relationship graph is generated based on the embedded features. The relationship graph represents behavior of the network elements in the wireless communication network. This could include, for example, the gNB 102 performing the graph construction operation 502 to generate a relationship graph, such as the relationship graph 406.

At step 1306, one or more anomalies in the wireless communication network are detected using the relationship graph. The one or more anomalies identify one or more deviations of one or more of the network elements from an expected behavior of the one or more network elements. This could include, for example, the gNB 102 performing the graph-based anomaly detection operation 503 to detect anomalies.

At step 1308, network analytics are generated based on the one or more detected anomalies. This could include, for example, the gNB 102 using the AI module 408 and the relationship graph 406 to generate network analytics 412, which can include an anomaly causal graph 414, a root cause ranking 416, one or more ACI messages 418, or a combination of these.

At step 1310, the one or more detected anomalies are scored for prioritization of troubleshooting. This could include, for example, the gNB 102 performing the anomaly scoring operation 504 to determine a z-score for each anomaly.

Although FIG. 13 illustrates one example of a method 1300 for graph-based anomaly detection, various changes may be made to FIG. 13. For example, while shown as a series of steps, various steps in FIG. 13 could overlap, occur in parallel, occur in a different order, or occur any number of times.

Although the present disclosure has been described with an exemplary embodiment, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A method comprising:

generating multiple embedded features representing operational data of network elements in a wireless communication network, wherein the operational data comprises numerical features that are aggregated and projected, by an embedding layer, into embedded features in multidimensional vector space;

generating a relationship graph based on the multiple embedded features, the relationship graph representing a behavior of the network elements in the wireless communication network;

detecting one or more anomalies in the wireless communication network using the relationship graph, the one or more anomalies identifying one or more deviations of one or more network elements from an expected behavior of the one or more network elements that is identified based on a fusing operation between the behavior of the network elements and a behavior of neighbor network elements; and generating network analytics based on the one or more detected anomalies.

2. The method of claim 1, further comprising:

scoring the one or more detected anomalies for prioritization of troubleshooting.

3. The method of claim 1, further comprising standardizing the numerical features of the operational data into standardized features before aggregating and projecting the numerical features, wherein the operational data further comprises non-numerical data encoded based on a variable encoding operation to identify numerical values of the non-numerical data.

4. The method of claim 1, wherein generating the relationship graph based on the embedded features comprises:

categorizing the embedded features into interactive features and non-interactive features;

applying a community detection algorithm to the interactive features to determine one or more subgraphs representing communities of the network elements;

calculating interactive ratios for each pair of nodes in each of the one or more subgraphs; and filtering out a plurality of network elements from the network elements based on the calculated interactive ratios.

5. The method of claim 1, wherein detecting the one or more anomalies in the wireless communication network using the relationship graph comprises:

generating an attention matrix based on the relationship graph and a time series of the embedded features;

generating neighbor fusing vectors by fusing information of the one or more network elements with information of neighboring network elements using an aggregation algorithm and the attention matrix; and forecasting the expected behavior of the one or more network elements using a multi-layer neural network that receives the neighbor fusing vectors.

6. The method of claim 1, wherein the network analytics comprise at least one of an anomaly causal graph and a root cause ranking.

7. The method of claim 1, wherein the operational data of the network elements comprises at least one of performance management data, fault management data, and configuration management data.

8. A device comprising:

a transceiver; and a processor operably connected to the transceiver, the processor configured to:

generate multiple embedded features representing operational data of network elements in a wireless communication network, wherein the operational data comprises numerical features that are aggregated and projected, by an embedding layer, into embedded features in multidimensional vector space;

generate a relationship graph based on the multiple embedded features, the relationship graph representing a behavior of the network elements in the wireless communication network;

detect one or more anomalies in the wireless communication network using the relationship graph, the one or more anomalies identifying one or more deviations of one or more network elements from an expected behavior of the one or more network elements that is identified based on a fusing operation between the behavior of the network elements and a behavior of neighbor network elements; and generate network analytics based on the one or more detected anomalies.

9. The device of claim 8, wherein the processor is further configured to:

score the one or more detected anomalies for prioritization of troubleshooting.

10. The device of claim 8, wherein the processor is further configured to standardize the numerical features of the operational data into standardized features before aggregating and projecting the numerical features, and wherein the operational data further comprises non-numerical data encoded based on a variable encoding operation to identify numerical values of the non-numerical data.

11. The device of claim 8, wherein, to generate the relationship graph based on the embedded features, the processor is configured to:

categorize the embedded features into interactive features and non-interactive features;

apply a community detection algorithm to the interactive features to determine one or more subgraphs representing communities of the network elements;

calculate interactive ratios for each pair of nodes in each of the one or more subgraphs; and filter out a plurality of network elements from the network elements based on the calculated interactive ratios.

12. The device of claim 8, wherein, to detect the one or more anomalies in the wireless communication network using the relationship graph, the processor is configured to:

generate an attention matrix based on the relationship graph and a time series of the embedded features;

generate neighbor fusing vectors by fusing information of the one or more network elements with information of neighboring network elements using an aggregation algorithm and the attention matrix; and forecast the expected behavior of the one or more network elements using a multi-layer neural network that receives the neighbor fusing vectors.

13. The device of claim 8, wherein the network analytics comprise at least one of an anomaly causal graph and a root cause ranking.

14. The device of claim 8, wherein the operational data of the network elements comprises at least one of performance management data, fault management data, and configuration management data.

15. A non-transitory computer readable medium comprising program code that, when executed by a processor of a device, causes the device to:

generate multiple embedded features representing operational data of network elements in a wireless communication network, wherein the operational data comprises numerical features that are aggregated and projected, by an embedding layer, into embedded features in multidimensional vector space;

generate a relationship graph based on the multiple embedded features, the relationship graph representing a behavior of the network elements in the wireless communication network;

detect one or more anomalies in the wireless communication network using the relationship graph, the one or more anomalies identifying one or more deviations of one or more network elements from an expected behavior of the one or more network elements that is identified based on a fusing operation between the behavior of the network elements and a behavior of neighbor network elements; and generate network analytics based on the one or more detected anomalies.

16. The non-transitory computer readable medium of claim 15, wherein the program code further causes the device to:

score the one or more detected anomalies for prioritization of troubleshooting.

17. The non-transitory computer readable medium of claim 15, wherein the program code to generate the multiple embedded features comprises program code to standardize the numerical features of the operational data into standardized features before aggregating and projecting the numerical features, wherein the operational data further comprises non-numerical data encoded based on a variable encoding operation to identify numerical values of the non-numerical data.

18. The non-transitory computer readable medium of claim 15, wherein the program code to generate the relationship graph based on the embedded features comprises program code to:

categorize the embedded features into interactive features and non-interactive features;

apply a community detection algorithm to the interactive features to determine one or more subgraphs representing communities of the network elements;

calculate interactive ratios for each pair of nodes in each of the one or more subgraphs; and filter out a plurality of network elements from the network elements based on the calculated interactive ratios.

19. The non-transitory computer readable medium of claim 15, wherein the program code to detect the one or more anomalies in the wireless communication network using the relationship graph comprises program code to:

generate an attention matrix based on the relationship graph and a time series of the embedded features;

generate neighbor fusing vectors by fusing information of the one or more network elements with information of neighboring network elements using an aggregation algorithm and the attention matrix; and forecast the expected behavior of the one or more network elements using a multi-layer neural network that receives the neighbor fusing vectors.

20. The non-transitory computer readable medium of claim 15, wherein the network analytics comprise at least one of an anomaly causal graph and a root cause ranking.

* * * * *